(12) United States Patent
Liu et al.

(10) Patent No.: US 11,577,850 B2
(45) Date of Patent: Feb. 14, 2023

(54) AIRCRAFT, CONTROL METHOD, APPARATUS AND COMPUTER READABLE STORAGE MEDIUM FOR AIRCRAFT

(71) Applicant: HANWANG TECHNOLOGY CO., LTD., Beijing (CN)

(72) Inventors: Jing Liu, Beijing (CN); Pengsheng Jing, Beijing (CN); Hai Hu, Beijing (CN); Yingjian Liu, Beijing (CN)

(73) Assignee: HANWANG TECHNOLOGY CO., LTD., Beijing (CN)

( * ) Notice: Subject to any disclaimer, the term of this patent is extended or adjusted under 35 U.S.C. 154(b) by 287 days.

(21) Appl. No.: 16/836,050

(22) Filed: Mar. 31, 2020

(65) Prior Publication Data

US 2021/0086907 A1 Mar. 25, 2021

(30) Foreign Application Priority Data

Sep. 20, 2019 (CN) .......................... 201910895313.0

(51) Int. Cl.
*B64D 31/08* (2006.01)
*B64C 19/02* (2006.01)
*B64C 33/02* (2006.01)
*A63H 29/22* (2006.01)
*G05D 1/00* (2006.01)
*H02P 1/02* (2006.01)
*B64C 39/02* (2023.01)

(52) U.S. Cl.
CPC .............. *B64D 31/08* (2013.01); *A63H 29/22* (2013.01); *B64C 19/02* (2013.01); *B64C 33/025* (2013.01); *G05D 1/0055* (2013.01); *H02P 1/022* (2013.01); *B64C 39/024* (2013.01); *B64C 2201/025* (2013.01); *B64C 2201/141* (2013.01)

(58) Field of Classification Search
CPC ........ B64D 31/08; B64D 31/06; B64D 45/00; B64D 27/24; A63H 29/22; B64C 19/02; B64C 33/025; B64C 39/024; B64C 2201/025; B64C 2201/141; B64C 33/00; B64C 33/02; G05D 1/0055; G05D 1/0808; H02P 1/022
USPC ............................................................ 701/3
See application file for complete search history.

(56) References Cited

U.S. PATENT DOCUMENTS 7,607,610 B1 10/2009 Sterchak
9,671,787 B2 6/2017 Foinet et al.
(Continued)

FOREIGN PATENT DOCUMENTS

CN 105314120 A 2/2016
CN 105388901 A 3/2016
CN 206623990 U 11/2017
(Continued)

*Primary Examiner* — Muhammad Shafi
(74) *Attorney, Agent, or Firm* — Banner & Witcoff, Ltd.

(57) ABSTRACT

The application relates to an aircraft, a method, an apparatus and a computer readable storage medium for controlling the aircraft with at least one sensor arranged thereon, the method including detecting a motor state of the aircraft, acquiring at least one sensing data of the at least one sensor, and controlling the aircraft to perform a startup operation or a shutdown operation according to the motor state and the at least one sensing data, so that the aircraft can be autonomously controlled to perform the startup operation or the shutdown operation, and the user experience is improved.

15 Claims, 3 Drawing Sheets

(56) References Cited

U.S. PATENT DOCUMENTS

2019/0317531 A1* 10/2019 Tankersley ............ B64C 39/024
2020/0066167 A1*  2/2020 Chen .................... G05D 1/0022

FOREIGN PATENT DOCUMENTS

| CN | 107608378 A | * | 1/2018 |
| CN | 205405267 U | * | 7/2018 |
| CN | 110654536 A |   | 1/2020 |
| WO | WO-2018196494 | * | 11/2018 |

* cited by examiner

AIRCRAFT, CONTROL METHOD, APPARATUS AND COMPUTER READABLE STORAGE MEDIUM FOR AIRCRAFT

TECHNICAL FIELD

The disclosure relates to the field of aircraft, in particular to an aircraft, a control method, a control apparatus and a computer readable storage medium for aircraft.

BACKGROUND

The Bionic flapping-wing aircraft has been developed for more than 30 years. However, commercialization of the bionic flapping-wing aircraft is difficult to develop due to low load capacity and poor autonomous flight capability and the like caused by flapping wing flight mode. At present, bionic flapping-wing aircrafts in the market are basically controlled by a driving motor and a remote controller. Users are required to control the remote controller to generate instructions, and the instructions are transmitted to the aircraft through wireless communication, in order to control the switching of the aircraft, making it less entertaining.

SUMMARY

In view of this, an aircraft, a control method, an apparatus and a computer readable storage medium for aircraft are provided, which enable the aircraft to be started up and shut down autonomously.

In an aspect of the disclosure, there is provided a method for controlling an aircraft, wherein at least one sensor is arranged on the aircraft, the method comprising: detecting a motor state of the aircraft; acquiring at least one sensing data of the at least one sensor; and controlling the aircraft to perform a startup operation or a shutdown operation according to the motor state and the at least one sensing data.

In an embodiment, the step of controlling the aircraft to perform the startup operation according to the motor state and the at least one sensing data comprises: controlling the aircraft to perform the startup operation when determining that a current state of the aircraft meets a preset startup condition.

In an embodiment, the step of controlling the aircraft to perform the startup operation when determining that the current state of the aircraft meets a preset startup condition comprises: determining the current state of the aircraft to meet the preset startup condition when the current state of the aircraft is any one of an up-and-down motion state, a back-and-forth motion state, a left-and-right motion state, a free falling body state, a forced forward motion state, and a rolling motion state, and controlling the aircraft to perform the startup operation.

In an embodiment, the at least one sensor includes an infrared sensor, the at least one sensing data includes infrared data, and the infrared data includes a distance between the aircraft and an obstacle around the aircraft during flight; and wherein the step of controlling the aircraft to perform the startup operation comprises: judging whether the distance is greater than a first preset distance before controlling the aircraft to perform the startup operation, and performing the step of controlling the aircraft to perform the startup operation when the distance is greater than the first preset distance.

In an embodiment, the motor state includes a shutdown state, the at least one sensor includes an accelerometer, and the at least one sensing data includes acceleration data in a three-dimensional coordinate system established by X, Y, and Z axes, wherein the direction of the X axis is the left-to-right direction of the body of the aircraft, the direction of the Y axis is the back-to-front direction of the body of the aircraft, and the direction of the Z axis is the bottom-to-top direction of the body of the aircraft; and wherein the current state of the aircraft is the up-and-down motion state when the current state of the aircraft meets following condition: a change trend of the acceleration data acquired when the motor state is the shutdown state is that Z-axis acceleration data changes from a second value range to above a first preset threshold and falls back below a second preset threshold during a first preset time period.

In an embodiment, the change trend further includes that the X-axis acceleration data is within a first value range and the Y-axis acceleration data is within the first value range during the first preset time period.

In an embodiment, the motor state includes a shutdown state, the at least one sensor includes an accelerometer, and the at least one sensing data includes acceleration data in a three-dimensional coordinate system established by X, Y, and Z axes, wherein the direction of the X axis is the left-to-right direction of the body of the aircraft, the direction of the Y axis is the back-to-front direction of the body of the aircraft, and the direction of the Z axis is the bottom-to-top direction of the body of the aircraft; and wherein the current state of the aircraft is the rolling state when the current state of the aircraft meets following condition: a change trend of the acceleration data acquired when the motor state is the shutdown state is that X-axis acceleration data changes from a first value range to a second value range or a third value range, Z-axis acceleration data changes from the second value range to the first value range during a second preset time period, and the X-axis acceleration data changes from the second value range or the third value range and the changed X-axis acceleration data is within the first value range, and the Z-axis acceleration data changes from the first value range to the second value range during a third preset time period.

In an embodiment, the change trend further includes that Y-axis acceleration data is within the first value range both during the second preset time period and the third preset time period.

In an embodiment, the step of controlling the aircraft to perform the shutdown operation according to the motor state and the at least one sensing data comprises: controlling the aircraft to perform the shutdown operation when determining that the current state of the aircraft meets a preset shutdown condition.

In an embodiment, the step of controlling the aircraft to perform the shutdown operation when determining that the current state of the aircraft meets the preset shutdown condition comprises: determining the current state of the aircraft to meet the preset shutdown condition when the current state of the aircraft is at least one of an impact state, a nose-up state, a tail-up state, a fuselage bottom-up state, a state of a normal motor rotation speed and a slow flight speed, and a trapped state, and controlling the aircraft to perform the shutdown operation.

In an embodiment, the motor state includes a startup state, the at least one sensor includes an accelerometer, the at least one sensing data includes acceleration data in a three-dimensional coordinate system established by X, Y, and Z axes, wherein the direction of the X axis is the left-to-right direction of the body of the aircraft, the direction of the Y axis is the back-to-front direction of the body of the aircraft, and the direction of the Z axis is the bottom-to-top direction of the body of the aircraft; and wherein the current state of the aircraft is the impact state when the current state of the aircraft meets following condition: a change trend of the acceleration data acquired when the motor state is the startup state is that Y-axis acceleration data changes from a fourth value range to above a fourth preset threshold and Z-axis acceleration data changes from a fifth value range to above a fifth preset threshold during a fourth preset time period.

In an embodiment, the motor state includes a startup state, the at least one sensor includes an accelerometer, the at least one sensing data includes acceleration data in a three-dimensional coordinate system established by X, Y, and Z axes, wherein the direction of the X axis is the left-to-right direction of the body of the aircraft, the direction of the Y axis is the back-to-front direction of the body of the aircraft, and the direction of the Z axis is the bottom-to-top direction of the body of the aircraft; and wherein the current state of the aircraft is the fuselage bottom-up state when the current state of the aircraft meets following condition: a change trend of the acceleration data acquired when the motor state is the startup state is that X-axis acceleration data is within a sixth value range, Y-axis acceleration data is within the sixth value range, and Z-axis acceleration data is within a third value range.

In an embodiment, the motor state includes a startup state; the at least one sensor includes an accelerometer and an infrared sensor; the at least one sensing data includes infrared data and acceleration data in a three-dimensional coordinate system established by X, Y and Z axes, wherein the direction of the X axis is the left-to-right direction of the body of the aircraft, the direction of the Y axis is the back-to-front direction of the body of the aircraft, and the direction of the Z axis is the bottom-to-top direction of the body of the aircraft, and the infrared data includes a distance between the aircraft and an obstacle around the aircraft during flight; and wherein the current state of the aircraft is the trapped state when the current state of the aircraft meets the following conditions: the distance is smaller than a second preset distance and X-axis acceleration data of the acceleration data acquired when the motor state is the startup state is within a sixth value range, Y-axis acceleration data of the acceleration data is within a fourth value range, and Z-axis acceleration data of the acceleration data is within a fifth value range during a fifth preset time period.

In another aspect of the disclosure, there is provided a switching apparatus of an aircraft, which comprises at least one sensor, the apparatus comprising a detection module which, in operation, detects a motor state of the aircraft; an acquisition module which, in operation, acquires at least one sensing data of the at least one sensor; and a control module which, in operation, controls the aircraft to perform a startup operation or a shutdown operation according to the motor state and the at least one sensing data.

In yet another aspect of the disclosure, there is provided a switching apparatus of an aircraft, comprising a sensor, a processor and a motor, the sensor being connected to the processor, and the processor being connected to the motor, wherein, the sensor, in operation, collects at least one sensing data and sends the at least one sensing data to the processor; the processor, in operation, detects a motor state of the aircraft, generates a control instruction according to the motor state and the at least one sensing data, and sends the control instruction to the motor; the motor, in operation, performs a startup operation or a shutdown operation according to the control instruction.

In yet another aspect of the disclosure, there is provided an aircraft, which includes a fuselage and a switching apparatus of the aircraft according to any one of the above embodiments, wherein the switching apparatus is connected to the fuselage.

In yet another aspect of the disclosure, there is provided a non-transitory computer readable storage medium having stored thereon computer program that, when executed by a processor, performs steps of the method of any one of the above embodiments.

DETAILED DESCRIPTION

In order to make the object, technical scheme and advantages of the application more clear, the application will be described in further detail below with reference to the drawings and embodiments. It should be understood that the specific embodiments described herein are only for the purpose of explaining this application and are not intended to limit this application.

Technical terms or scientific terms used in this disclosure shall have the ordinary meaning understood by those with ordinary skills in the field to which this disclosure belongs, unless otherwise defined. The words "first", "second" and the like used in this disclosure do not indicate any order, quantity or importance, but are only used to distinguish different components. Similarly, similar words such as "a", "an" or "the" and the like do not denote a limitation of quantity, but rather denote the presence of at least one. Similar words such as "include" or "comprise" mean that the element or article appearing before the words cover the elements or articles listed after the words and their equivalents, and do not exclude other elements or articles. Similar words such as "connected . . . to" or "connected to" are not limited to physical or mechanical connections, but may include electrical connections, no matter direct or indirect. "Up", "down", "left" and "right" are only used to indicate the relative positional relationship. When the absolute position of the described object changes, the relative positional relationship may also change accordingly.

Figure 1:
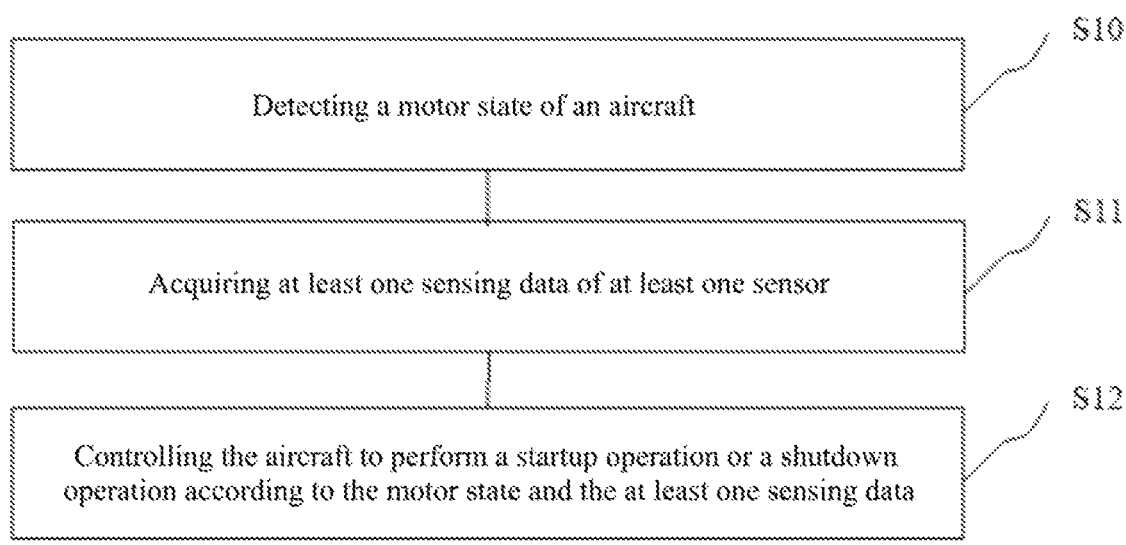
FIG. 1 is a schematic flow chart of a method for starting up and shutting down an aircraft according to an embodiment.

In an embodiment, as shown in FIG. 1, there is provided a method for starting up and shutting down an aircraft, wherein at least one sensor is arranged on the aircraft, the method comprising the following steps.

At step S10, a motor state of the aircraft is detected.

wherein, the motor state includes a shutdown state and a startup state, and the switching of the motor state determines a flight state of the aircraft. The shutdown state indicates that the motor is not in a working state and the aircraft is not in a flying state. The startup state indicates that the motor is in the working state, and the aircraft is in the flying state, etc.

In an embodiment, the aircraft may be a flapping-wing aircraft or other types of aircraft.

At step S11, at least one sensing data of the at least one sensor is acquired.

The at least one sensor includes, but is not limited to, an accelerometer and an infrared sensor, and correspondingly, the at least one sensing data includes, but is not limited to, acceleration data and infrared data. A movement trend of the aircraft during a selected time period can be obtained by analyzing the acceleration data measured by the accelerometer, and a distance between the aircraft and each of its surrounding obstacles can be obtained by analyzing the infrared data measured by the infrared sensor.

At step S12, the aircraft is controlled to perform a startup operation or a shutdown operation according to the motor state and the at least one sensing data.

In the embodiment of the present disclosure, the motor state is acquired, and the at least one acquired sensing data is analyzed. When the motor state is in a shutdown state, whether the at least one sensing data meets a startup condition is analyzed. The aircraft is controlled to perform the startup operation when the startup condition is met; and the startup operation is not performed when the startup condition is not met. When the motor state is in a startup state, whether at least one sensing data meets a shutdown condition is analyzed. The aircraft is controlled to perform the shutdown operation when the shutdown condition is met; and the shutdown operation is not performed when the shutdown condition is not met.

The above method for starting up and shutting down the aircraft on which at least one sensor is arranged, controls the aircraft to perform the startup operation or the shutdown operation according to the detected motor state of the aircraft and at least one sensing data of the at least one sensor. Because at least one sensor is arranged on the aircraft, the sensor can collect data at anytime and anywhere. The aircraft can be autonomously controlled to perform the startup operation or the shutdown operation according to the detected motor state and the at least one obtained sensing data, so that there is no need to manually control a remote controller to generate an instruction by a user, and to transmit the instruction to the aircraft through wireless communication for controlling the aircraft to be started up or shut down, thereby improving experience of the user.

Figure 2:
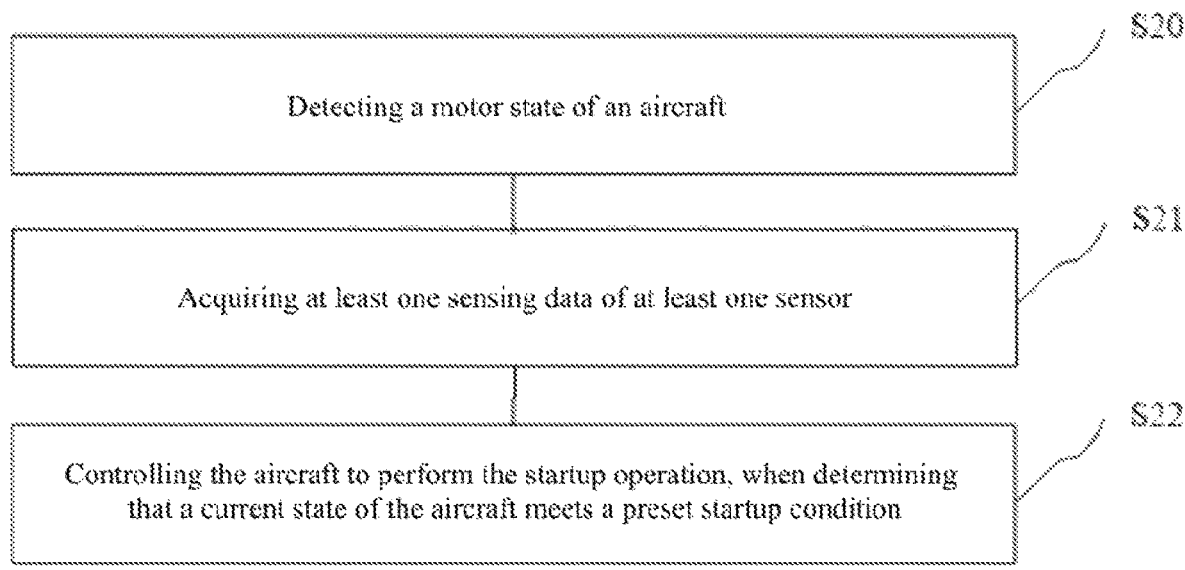
FIG. 2 is a schematic flow chart of a method for starting up and shutting down an aircraft according to an embodiment.

In an embodiment, as shown in FIG. 2, there is provided a method for starting up and shutting down an aircraft, wherein at least one sensor is arranged on the aircraft, the method comprising the following steps:

At step S20, a motor state of the aircraft is detected.

At step S21, at least one sensing data of the at least one sensor is acquired.

In the embodiment of the present disclosure, the contents of the step S20 and the step S21 are the same as those in the step S10 and the step S11 described above, and will not be repeated here.

At step S22, the aircraft is controlled to perform a startup operation when it is determined that a current state of the aircraft meets a preset startup condition.

In the embodiment of the present disclosure, the current state of the aircraft can be determined according to the motor state and at least one sensing data. The aircraft is controlled to perform the startup operation when the current state of the aircraft meets the preset startup condition.

The startup conditions can be preset according to requirements. For example, the preset startup conditions include any one of an up-and-down motion state, a back-and-forth motion state, a left-and-right motion state, a free falling body state, a forced forward motion state, and a rolling motion state, etc. The startup condition can be set and modified according to user's habits, etc. Take the two conditions of the up-and-down motion of the aircraft and the rolling motion of the aircraft as example to illustrate hereafter.

Specifically, assuming that the preset startup condition includes the up-and-down motion of the aircraft, the step S22 specifically comprises: determining the current state of the aircraft to meet the preset startup condition when the current state of the aircraft is determined to be the up-and-down motion state according to the motor state and the at least one sensing data, and controlling the aircraft to perform the startup operation.

In the embodiment of the present disclosure, the current state of the aircraft is determined to be the up-and-down motion state according to the motor state and at least one sensing data. Since the preset startup condition is also that the aircraft be in the up-and-down motion state, the determined current state of the aircraft is the same as the preset startup condition (the same here refers to the movement trend is similar or the same, and the movement amplitude is not required to be identical). Therefore, it is determined that the current state of the aircraft meets the preset startup condition, and the aircraft is controlled to perform the startup operation.

In an embodiment of the present disclosure, the motor state is in a shutdown state, and the at least one sensor includes an accelerometer. In an embodiment, the accelerometer is a triaxial accelerometer which can measure acceleration data in all directions in a three-dimensional space. The at least one sensing data includes acceleration data of a three-dimensional coordinate system established by X, Y and Z axes. The specific process of determining the current state of the aircraft as the up-and-down motion state is as follows.

A change trend of the acceleration data is acquired when the motor state is the shutdown state; and the current state of the aircraft is determined to be the up-and-down motion state when the change trend is that Z-axis acceleration data changes from a second value range to above a first preset threshold and falls back below a second preset threshold during a first preset time period.

Figure 3:
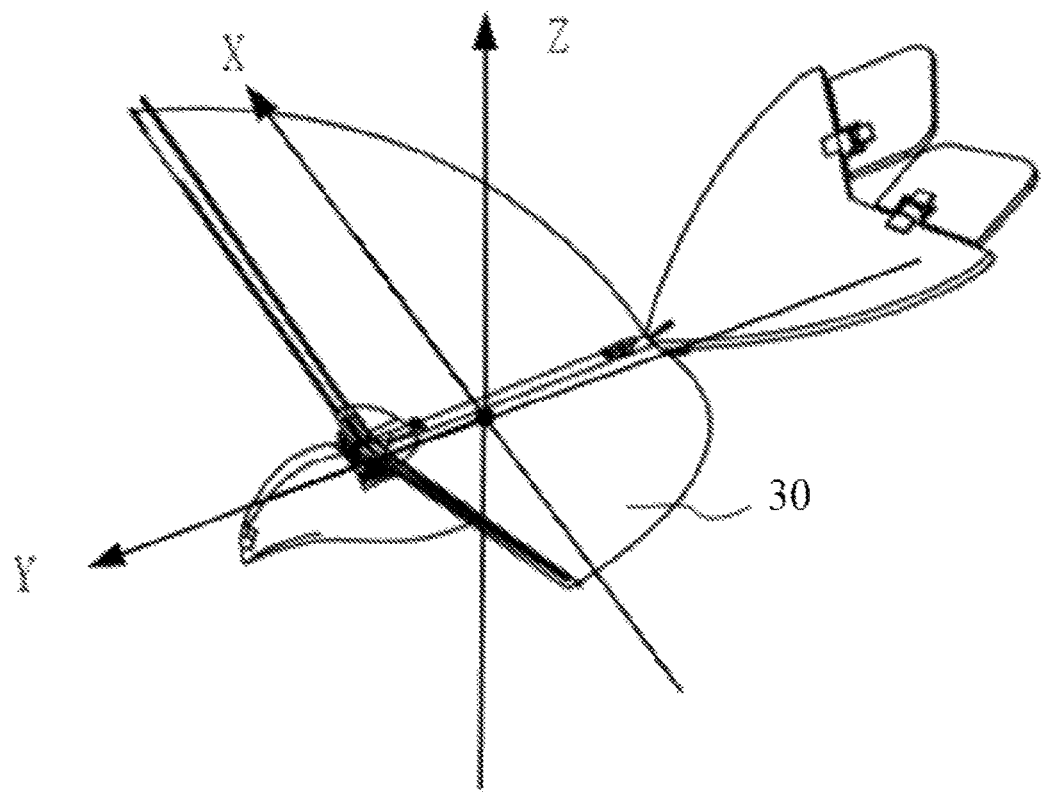
FIG. 3 is a schematic view of acceleration direction in an aircraft according to an embodiment.

In an embodiment of the present disclosure, the aircraft is initialized, the aircraft is in the shutdown state, the bottom of the fuselage is downward, and the nose is placed facing away from a user. The Z-axis acceleration data is within, for example, −1.2 g~−0.8 g to ensure that the bottom of the fuselage is downward when the body (i.e., fuselage) of the aircraft starts to move. As shown in FIG. 3, it is assumed that the direction of the X axis is the left-to-right direction of the body of the aircraft, the direction of the Y axis is the back-to-front direction of the body of the aircraft, and the direction of the Z axis is the bottom-to-top direction of the body of the aircraft (the X, Y and Z axes are perpendicular to each other by default). The Z-axis acceleration data increases greatly when the aircraft is upward and decreases greatly when the aircraft is downward during a short time period, when a user shakes the aircraft up and down from an initial state (the initial state is for example that the bottom of the fuselage is downward and the nose faces away from the user). For example, the current state of the aircraft is determined to be the up-and-down motion state when the Z-axis acceleration data changes from the second value range (for example, −1.2 g~−0.8 g) to above the first preset threshold value (for example, 1 g) and falls back below the second preset threshold value (for example, −1.5 g) during 250 ms for example. Those skilled in the art can understand that although the second preset threshold is smaller than the lower limit of the second value range in the above example, it is only an example and the present disclosure is not limited thereto. The current state of the aircraft is determined by analyzing the acceleration data. The current state of the aircraft is determined to be the up-and-down motion state when the change trend of acceleration data is consistent with the preset change trend during a time period. Because the preset startup condition is the up-and-down motion of the aircraft, the current state of the aircraft is the same as the preset startup condition, whereby the current state of the aircraft is determined to meet the preset startup condition and the aircraft is controlled to perform the startup operation.

In an embodiment, the change trend of the acceleration data is acquired when the motor state is the shutdown state. The current state of the aircraft is determined to be the up-and-down motion state when the change trend is as follows: the X-axis acceleration data is within a first value range and the Y-axis acceleration data is within the first value range during the first preset time period; and the Z-axis acceleration data changes from the second value range to above the first preset threshold value and falls back to below the second preset threshold value during the first preset time period. Conditional restriction on the acceleration data of each of the X, Y and Z axes can prevent startup caused by false triggering when only the change trend of the Z-axis acceleration data meets the startup conditions in a certain state.

In the embodiment of the present disclosure, the aircraft is initialized, the aircraft is in the shutdown state, the fuselage is horizontal to the ground, the bottom of the fuselage is downward, and the nose is placed facing away from a user. In an embodiment of the present disclosure, the current X-axis acceleration data and the current Y-axis acceleration data of the aircraft are acquired to determine whether the aircraft is in a state where the wing is relatively horizontal, that is, the theoretical horizontal inclination angle is within a deviation of ±20°. In the embodiment of the present disclosure, the horizontal inclination angle is not directly calculated, but determined directly when the X-axis acceleration data and the Y-axis acceleration data are within, for example, −0.4 g~0.4 g. The two approaches have the same physical meaning for the body of the aircraft in a relatively static state. Using the X-axis acceleration data and the Y-axis acceleration data for determination accelerates the processing speed and removes unnecessary calculation amount. Also, actual experience tests show that the caused horizontal inclination angle deviation does not affect the stability of an aircraft after taking off, when the X-axis acceleration data and the Y-axis acceleration data are within, for example, −0.4 g~0.4 g. The Z-axis acceleration data is within, for example, −1.2 g~−0.8 g to ensure that the bottom of the fuselage is downward when the body of the aircraft starts to move.

In an embodiment of the present disclosure, as shown in FIG. 3, it is assumed that the direction of the X axis is the left-to-right direction of the body of the aircraft, the direction of the Y axis is the back-to-front direction of the body of the aircraft, and the direction of the Z axis is the bottom-to-top direction of the body of the aircraft (for example, the X, Y and Z axes are perpendicular to each other). Those skilled in the art can understand that the direction of the X axis being the left-to-right direction of the body of the aircraft, the direction of the Y axis being the back-to-front direction of the body of the aircraft, and the direction of the Z axis being the bottom-to-top direction of the body of the aircraft in the foregoing description is merely an example, and the present disclosure is not limited thereto. For example, the direction of the X axis can also be the right-to-left direction of the body of the aircraft, etc. The Z-axis acceleration data greatly increases when the aircraft is upward and the Z-axis acceleration data greatly decreases when the aircraft is downward during a short time period, when a user shakes an aircraft up and down from an initial state (the initial state is, for example, that the body of the aircraft is horizontal to the ground, the bottom of the fuselage is downward, and the nose faces away from the user). For example, the current state of the aircraft is determined to be the up-and-down motion state when the X-axis acceleration data is within the first value range (for example, −0.4 g~0.4 g), the Y-axis acceleration data is within the first value range, and the Z-axis acceleration data changes from the second value range (for example, −1.2 g~−0.8 g) to above the first preset threshold value (for example, 1 g) and falls back below the second preset threshold value (for example, −1.5 g) during 250 ms for example. The current state of the aircraft is determined by analyzing the acceleration data. The current state of the aircraft is determined to be the up-and-down motion state when the change trend of acceleration data is consistent with the preset change trend during a time period. Because the preset startup condition is the up-and-down motion of the aircraft, the current state of the aircraft is the same as the preset startup condition, whereby the current state of the aircraft is determined to meet the preset startup condition and the aircraft is controlled to perform the startup operation.

It should be noted that in the process of analyzing the change trend of the acceleration data, it is determined that the initial state of the aircraft is a state that the body of the aircraft is horizontal to the ground by analyzing that the initial value of the X-axis acceleration data and the Y-axis acceleration data are within, for example, −0.4 g~0.4 g, and the initial value of the Z-axis acceleration data is within, for example, −1.2 g~−0.8 g. In an embodiment, an initial state of an aircraft that conforms to the normal condition is a state that the body of the aircraft is horizontal to the ground, the bottom of the fuselage is downward, and the nose faces away from the user, just like a state that a user releases a paper aircraft. The current state of the aircraft is the up-and-down motion state as long as the aircraft is in the above-mentioned initial state and the subsequent acceleration change trend meets the above-mentioned change trend.

It should be noted that in the process of analyzing the change trend of acceleration data, it is always determined whether the X-axis acceleration data is within the first value range (for example, −0.4 g~0.4 g) and whether the Y-axis acceleration data is within the first value range, so that the movement can be ensured to be up and down basically horizontally, and startup caused by false triggering can be avoided.

The up-and-down motion is set, so that a peak appears followed by a valley in a coordinate system established by the Z-axis acceleration data and time. Whereas, the above motion cannot appear during a short time when the flapping-wing aircraft is stationary, that is, the peak followed by the valley do not appear in the coordinate system established by the Z-axis acceleration data and time when the flapping-wing aircraft is stationary. Even if a user shuts down the aircraft during flight, the body of the aircraft freely falls or rotates in various ways, the change trend as in the determination condition that there is a peak followed by a valley in the Z-axis acceleration data wouldn't appear, and a restart mistakenly triggered after shutdown is avoided.

Assuming that the preset startup condition includes the aircraft rolling motion, step S22 specifically comprises: determining the current state of the aircraft to meet the preset startup condition when the current state of the aircraft is determined to be the rolling motion state according to the motor state and the at least one sensing data, and controlling the aircraft to perform the startup operation.

In the embodiment of the present disclosure, the current state of the aircraft is determined to be the rolling motion according to the motor state and at least one sensing data. Since the preset startup condition is that the aircraft is in the rolling motion state, the determined current state of the aircraft is the same as the preset startup condition. Therefore, the current state of the aircraft is determined to meet the preset startup condition, and the aircraft is controlled to perform the startup operation.

In an embodiment of the present disclosure, the motor state is in a shutdown state, and the at least one sensor includes an accelerometer. The accelerometer is for example a triaxial accelerometer which can measure acceleration data in all directions in a three-dimensional space. The at least one sensing data includes acceleration data of a three-dimensional coordinate system established by X, Y and Z axes. The specific process of determining the current state of the aircraft as the rolling motion state is as follows.

A change trend of the acceleration data is acquired when the motor state is the shutdown state. The state of the aircraft is determined to be the rolling motion state when the change trend is as follows: X-axis acceleration data changes from a first value range to a second value range or a third value range, Z-axis acceleration data changes from the second value range to the first value range, during a second preset time period; and the X-axis acceleration data changes from the second value range or the third value range and the changed X-axis acceleration data is within the first value range, and Z-axis acceleration data changes from the first value range to the second value range, during a third preset time period.

In an embodiment, when the motor state is the shutdown state, the change trend of the acceleration data is acquired. The current state of the aircraft is determined to be the rolling motion state when the change trend is as follows: the Y-axis acceleration data is within the first value range both during the second preset time period and the third preset time period; the X-axis acceleration data changes from the first value range to the second value range or the third value range and the Z-axis acceleration data changes from the second value range to the first value range, during the second preset time period; and the X-axis acceleration data changes from the second value range or the third value range and the changed X-axis acceleration data is within the first value range, and the Z-axis acceleration data changes from the first value range to the second value range, during the third preset time period.

In an embodiment of the present disclosure, data will have two stages of change when a user turns an aircraft laterally by 90° from an initial state (the initial state is for example that the body of the aircraft is horizontal to the ground, the bottom of the fuselage is downward, and the nose faces away from the user) and then turns back to the initial state. The first stage (turning 90° from the initial state, that is, the above-mentioned second preset time period), the X-axis acceleration data changes from the first value range (for example, −0.4 g~0.4 g) to the second value range (for example, −1.2 g~−0.8 g) or the third value range (0.8 g~1.2 g), the Y-axis acceleration data is within the first value range, and the Z-axis acceleration data changes from the second value range to the first value range. In the second stage (returning from 90° to the initial state, i.e. the above-mentioned third preset time period), the X-axis acceleration data changes from the second value range or the third value range and the changed X-axis acceleration data is within the first value range, the Y-axis acceleration data is within the first value range, and the Z-axis acceleration data changes from the first value range to the second value range. Then the current state of the aircraft is determined to be the rolling motion state. According to this rule, the current state of the aircraft is determined by analyzing the acceleration data. The current state of the aircraft is determined to be the rolling motion state when the change trend of the acceleration data is consistent with the above change trend during a time period. Because the preset startup condition is the rolling motion of the aircraft, the current state of the aircraft is the same as the preset startup condition, whereby the current state of the aircraft is determined to meet the preset startup condition and the aircraft is controlled to perform the startup operation.

It should be noted that in the process of analyzing the change trend of the acceleration data, it is determined that the initial state of the aircraft is a state that the body of the aircraft is horizontal to the ground by analyzing that the initial value of the X-axis acceleration data and the Y-axis acceleration data are within, for example, −0.4 g~0.4 g, and the initial value of the Z-axis acceleration data is within, for example, −1.2 g~−0.8 g. In an embodiment, an initial state of an aircraft that conforms to the normal condition is a state that the body of the aircraft is horizontal to the ground, the bottom of the fuselage is downward, and the nose faces away from the user, just like a state that a user releases a paper aircraft. The current state of the aircraft is indicated as the rolling motion state as long as the aircraft is in the above-mentioned initial state and the subsequent acceleration change trend meets the above-mentioned change trend. It can be determined accurately whether horizontal rolling occurs through the above change trend, whereby the occurrence of false triggering is avoided, and the accuracy of movement determination is ensured.

In an embodiment of the present disclosure, as shown in FIG. 3, the flapping-wing aircraft itself flies by flapping two basically horizontal but somewhat downwardly inclined wings 30 to provide upward lift to balance gravity and backward thrust to fly forward, respectively. It does not completely maintain a certain height, but floats up and down within a certain height range when flying forward. The flapping of the wing 30 is obviously reflected in the accelerometer data during a forward flight.

In the embodiment of the present disclosure, the above two movements are defined to realize the startup operation with respect to structural characteristics of the flapping-wing aircraft, hand-held habits of a user and the characteristics of no false alarm occurred when the motor is shut down. The two movements are as follows. The first is to level the wing of the body of the aircraft to the ground, hold the fuselage, shake it up and down, and automatically starts the electrode to make the wing start flapping. The second is to level the wing of the body of the aircraft to the ground, hold the body of the aircraft, turn the body of the aircraft laterally by 90°, and then return to the level. The sensor is used to sense the existing movement change of the body of the aircraft, which can realize that the motor can still be started up to work without the control of a remote controller to realize the take-off of the aircraft and make it more entertaining. In addition, two movements for starting the wing flapping are set. Starting the wing flapping can be realized by holding it on the hand and shaking it up and down, and can also be realized by turning the body of the aircraft over, thereby increasing the choices of a user. In addition, situations (i.e. the above two movements) that do not occur under various normal states of the aircraft are selected as the startup movement to avoid startup caused by false triggering.

Of course, the startup operation is not limited to the above two kinds of movements. For example, the current state of the aircraft maybe any one of a back-and-forth motion state (Y-axis acceleration data changes and falls back during a preset time period), a left-and-right motion state (X-axis acceleration data changes and falls back during a preset time period), a free falling body state (the aircraft is detected to perform free fall movement during a preset time period), a forced forward motion state (the aircraft is detected to perform parabolic movement during a preset time period), etc. Other startup operation movements designed based on the present embodiment and the inventive concept of the disclosure all fall within the scope of the present disclosure.

In an embodiment of the present disclosure, the sensor includes an infrared sensor, and the sensing data includes infrared data, wherein the infrared data includes a distance between the aircraft and each of obstacles around the aircraft during flight. Based on this, the step of controlling the aircraft to perform the startup operation comprises: judging whether the distance is greater than a first preset distance before controlling the aircraft to perform the startup operation, and performing the step of controlling the aircraft to perform the startup operation in response to the distance being greater than the first preset distance. That is, the magnitude relation between the distance and the first preset threshold value is judged in real time. It indicates that the nose direction is close to the obstacle and the startup operation cannot be performed when the distance is less than the first preset distance.

The first preset distance can be modified according to actual conditions, for example but not limited to 25 to 40 cm.

In the case that both the condition that the current state of the aircraft meets the preset startup condition and the condition that the infrared data shows that the distance is greater than the first preset distance are met, the aircraft is controlled to perform the startup operation. The startup operation cannot be performed when any one of the conditions are not met. There is no limitation to the sequential order of determining the two conditions. It can be determined that the current state of the aircraft meets the preset startup condition followed by judging that the distance is greater than the first preset distance, or it can be judged that the distance is greater than the first preset distance followed by determining that the current state of the aircraft meets the preset startup condition, or it can be determined at the same time that the current state of the aircraft meets the preset startup condition and that the distance is greater than the first preset distance.

With the above scheme, it is possible to avoid encountering obstacles and affecting flight during take-off.

Figure 4:
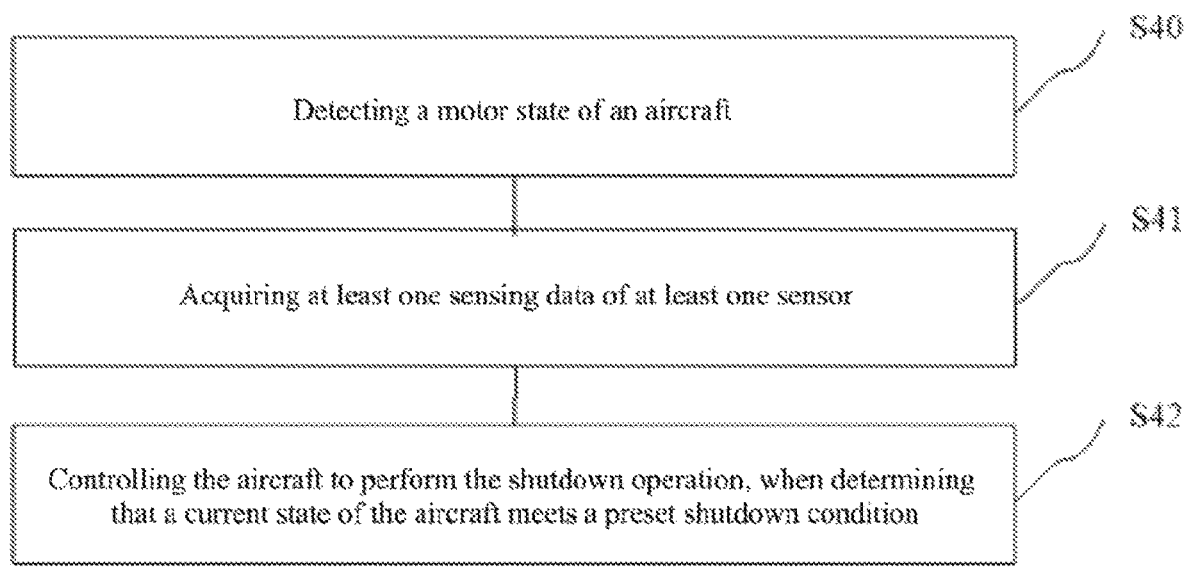
FIG. 4 is a schematic flow chart of a method for starting up and shutting down an aircraft according to an embodiment.

In an embodiment, as shown in FIG. 4, there is provided a method for starting up and shutting down an aircraft, wherein at least one sensor is arranged on the aircraft, the method comprising following steps.

At step S40, a motor state of the aircraft is detected.

At step S41, at least one sensing data of the at least one sensor is acquired.

In the embodiment of the present disclosure, the contents of the step S40 and the step S41 are the same as those in the step S10 and the step S11 described above, and will not be repeated here.

At step S42, the aircraft is controlled to perform a shutdown operation when determining that a current state of the aircraft meets a preset shutdown condition.

In the embodiment of the present disclosure, the current state of the aircraft can be determined according to the motor state and at least one sensing data, and the aircraft is controlled to perform the shutdown operation when the current state of the aircraft meets the preset shutdown condition.

The shutdown condition can be preset according to requirements. For example, the preset shutdown condition includes any one of an impact state, a nose-up state, a tail-up state, a fuselage bottom-up state, a state of a normal motor rotation speed and a slow flight speed, a trapped state, etc. The shutdown condition can be set and modified according to user habits, etc.

Specifically, assuming that the preset shutdown condition includes hitting motion, step S42 specifically comprises the following step.

The current state of the aircraft is determined to meet the preset shutdown condition when the current state of the aircraft is determined to be the impact state according to the motor state and the at least one sensing data, and the aircraft is controlled to perform the shutdown operation.

In the embodiment of the present disclosure, the current state of the aircraft is determined to be the hitting motion state according to the motor state and at least one sensing data. Since the preset shutdown condition is the hitting motion, the determined current state of the aircraft is the same as the preset shutdown condition. Therefore, the current state of the aircraft is determined to meet the preset shutdown condition, and the aircraft is controlled to perform the shutdown operation.

In an embodiment of the present disclosure, the motor state is in a startup state, and the at least one sensor includes an accelerometer. In an embodiments, the accelerometer is for example a triaxial accelerometer. The triaxial accelerometer can measure acceleration data in all directions in a three-dimensional space. The at least one sensing data includes acceleration data under a three-dimensional coordinate system established by X, Y and Z axes. The specific process of determining the current state of the aircraft as the hitting motion state is as follows.

A change trend of the acceleration data is acquired when the motor state is the startup state; and the current state of the aircraft is determined to be the impact state when the change trend is as follows: Y-axis acceleration data changes from a fourth value range to above a fourth preset threshold and Z-axis acceleration data changes from a fifth value range to above a fifth preset threshold during a fourth preset time period.

In the embodiment of the present disclosure, according to statistical analysis, the X axis can reflect the rolling state of the aircraft under the normal flight state of the body of the aircraft. The flapping wing cannot make large rolling movement in the X axis and the X-axis acceleration data is within a range of plus or minus less than 1 g due to the dynamics characteristics of the flapping wing. In an embodiment, the X-axis acceleration data is within −0.3 g~0.3 g for example. The Y-axis direction is subjected to thrust continually, with the direction pointing to the nose and the acceleration data within a range of plus or minus less than 1 g for example during normal flight. In an embodiment, the measured acceleration data of the Y-axis is within −0.3 g~−0.7 g for example, and the minus sign indicates that the acceleration points to the nose. In the Z-axis direction, the body of the aircraft always is in a state that the bottom of the fuselage is downward during flight. The Z-axis direction is mainly subjected to gravity and the Z-axis acceleration data is within a range of plus or minus less than 1.5 g for example when the altitude change is basically unchanged during normal flight. In an embodiment, the Z-axis acceleration data is within −1.1 g~−0.7 g for example.

The Y-axis direction will be immediately subjected to a force in the opposite direction in a short time when the nose is hit during flight, and then the body of the aircraft cannot remain horizontal, showing a feature of the nose being downward vertically or the tail being downward vertically. Specifically, for example, the Y-axis acceleration data changes from the fourth value range (for example, −0.3 g~−0.7 g) to above the fourth preset threshold value (for example 0.5 g), and the Z-axis acceleration data changes from the fifth value range (for example, −1.1 g~−0.7 g) to above the fifth preset threshold value (for example, −0.2 g) during 250 ms for example. According to this rule, the current state of the aircraft is determined by analyzing the acceleration data. The current state of the aircraft is determined to be the impact state when the change trend of the acceleration data is consistent with the above change trend during a time period. Because the preset shutdown condition is the hitting motion, the current state of the aircraft is the same as the preset shutdown condition, whereby the current state of the aircraft is determined to meet the preset shutdown condition and the aircraft is controlled to perform the shutdown operation.

It should be noted that in the process of the analysis of the change trend of acceleration data, the initial state of the aircraft is determined to be a normal flight state by analyzing that the initial value of the X-axis acceleration data is within a range of plus or minus less than 1 g for example (in an embodiment, the X-axis acceleration data is within −0.3 g~0.3 g for example), the initial value of the Y-axis acceleration data is within a range of plus or minus less than 1 g for example (in an embodiment, the Y-axis acceleration data is within −0.3 g~−0.7 g for example), and the initial value of the Z-axis acceleration data is within a range of plus or minus less than 1.5 g for example (in an embodiment, the Z-axis acceleration data is within −1.1 g~−0.7 g for example). The current state of the aircraft is the hitting motion state as long as the aircraft is in the initial state and the subsequent acceleration change trend meets the above change trend. Therefore, the acceleration change trend can be utilized to accurately determine whether the current state is the hitting motion state, so as to effectively avoid false shutdown and protect the safety of the body of the aircraft while ensuring accuracy. The initial values of the acceleration data of the X-axis, the Y-axis and the Z-axis are related to the weight of the aircraft itself for example, and can be adjusted accordingly according to the changes in the weight of the aircraft.

Assuming that the preset shutdown condition includes that the bottom of the fuselage is upward, step S42 specifically comprises: determining the current state of the aircraft to meet the preset shutdown condition when the current state of the aircraft is determined to be the fuselage bottom-up state according to the motor state and the at least one sensing data, and controlling the aircraft to perform the shutdown operation.

In the embodiment of the present disclosure, the current state of the aircraft is determined to be the fuselage bottom-up state according to the state of the motor and at least one sensing data. Since the preset shutdown condition is the fuselage bottom-up state, the determined current state of the aircraft is the same as the preset shutdown condition. Therefore, the current state of the aircraft is determined to meet the preset shutdown condition and the aircraft is controlled to perform the shutdown operation.

In an embodiment of the present disclosure, the motor state is in a startup state, and the at least one sensor includes an accelerometer. In an embodiment, the accelerometer is for example a triaxial accelerometer. The triaxial accelerometer can measure acceleration data in all directions in a three-dimensional space. The at least one sensing data includes acceleration data of a three-dimensional coordinate system established by X, Y and Z axes. The specific process of determining that the current state of the aircraft to be the fuselage bottom-up state is as follows.

A change trend of the acceleration data is acquired when the motor state is the startup state; and the current state of the aircraft is determined to be the fuselage bottom-up state when the change trend is that X-axis acceleration data is within a sixth value range, Y-axis acceleration data is within the sixth value range, and Z-axis acceleration data is within a third value range.

In the embodiment of the present disclosure, according to statistical analysis, the X axis can reflect the rolling state of the flapping wing under the normal flight state of the body of the aircraft. The flapping wing cannot make large rolling movement in the X axis and the X-axis acceleration data is within a range of plus or minus less than 1 g due to the dynamics characteristics of the flapping wing. In an embodiment, the X-axis acceleration data is within −0.3 g~0.3 g for example. The Y-axis direction is subjected to thrust continually with the direction pointing to the nose and the acceleration data within a range of plus or minus less than 1 g for example during normal flight. In an embodiment, the measured acceleration data of the Y-axis is within −0.3 g~−0.7 g for example, and the minus sign indicates that the acceleration points to the nose. In the Z-axis direction, the body of the aircraft is always in a state that the bottom of the fuselage is downward during flight. The Z-axis direction is mainly subjected to gravity and the Z-axis acceleration data is within a range of plus or minus less than 1.5 g for example (for example, −1.1 g~−0.7 g) when the altitude change is basically unchanged during normal flight. In an embodiment, the Z-axis acceleration data is within −1.1 g~−0.7 g for example.

The X-axis acceleration data is within the sixth value range (for example, −0.3 g~0.3 g), the Y-axis acceleration data is within the sixth value range (for example, −0.3 g~0.3 g), and the Z-axis acceleration data is within the third value range (for example, 0.8 g~1.2 g) when the bottom of the fuselage is upward during flight. According to this rule, the current state of the aircraft is determined by analyzing the acceleration data. The current state of the aircraft is determined to be the fuselage bottom-up state when the change trend of the acceleration data is consistent with the above change trend during a time period. Because the preset shutdown condition is that the bottom of the fuselage is upward, the current state of the aircraft is the same as the preset shutdown condition, whereby the current state of the aircraft is determined to meet the preset shutdown condition and the aircraft is controlled to perform the shutdown operation.

It should be noted that in the process of analyzing the change trend of acceleration data, the initial state of the aircraft is determined to be a normal flight state by analyzing that the initial value of the X-axis acceleration data is within a range of plus or minus less than 1 g for example (in an embodiment, the X-axis acceleration data is within −0.3 g~0.3 g for example), the initial value of the Y-axis acceleration data is within a range of plus or minus less than 1 g for example (in an embodiment, the Y-axis acceleration data is within –0.3 g~–0.7 g for example), and the initial value of the Z-axis acceleration data is within a range of plus or minus less than 1.5 g for example (in an embodiment, the Z-axis acceleration data is within –1.1 g~–0.7 g for example). The current state of the aircraft is the fuselage bottom-up state as long as the aircraft is within the initial state and the subsequent acceleration change trend meets the above change trend. In addition, no false alarm will be generated since the situation that the bottom of the fuselage is upward is obviously different from the normal flight state. Therefore, it can be determined whether the bottom of the fuselage of the aircraft is upward by determining whether the acceleration data conforms to the above value change trend directly, thereby quickly and effectively protecting the safety of the fuselage.

Assuming that the preset shutdown condition includes the trapped state, step S42 specifically comprises: determining the current state of the aircraft to meet the preset shutdown condition when the current state of the aircraft is determined to be the trapped state according to the motor state and the at least one sensing data, and controlling the aircraft to perform the shutdown operation.

The trapped motion means that a distance between the aircraft and an obstacle has been very small for a time period due to hitting or some other reasons, which means that the aircraft cannot escape from the trap and needs to be shut down.

In the embodiment of the present disclosure, the current state of the aircraft is determined to be the trapped state according to the motor state and at least one sensing data. Since the preset shutdown condition is the trapped state, the determined current state of the aircraft is the same as the preset shutdown condition. Therefore, the current state of the aircraft is determined to meet the preset shutdown condition, and the aircraft is controlled to perform the shutdown operation.

In an embodiment of the present disclosure, the motor state includes a startup state, the at least one sensor includes an accelerometer and an infrared sensor, the at least one sensing data includes infrared data and acceleration data under a three-dimensional coordinate system established by X, Y and Z axes, and the infrared data includes a distance between the aircraft and each of obstacles around the aircraft during flight. The specific process of determining the current state of the aircraft as the trapped state is as follows.

The acceleration data and the distance are acquired when the motor state is the startup state; and the current state of the aircraft is determined to be the trapped state when the X-axis acceleration data is within a sixth value range, the Y-axis acceleration data is within a fourth value range, the Z-axis acceleration data is within a fifth value range, and the distance is smaller than a second preset distance during a fifth preset time period.

In the embodiment of the present disclosure, according to the characteristics of the flapping-wing aircraft during normal flight and combined with a plurality of actual tests, it can be determined that the distance from the obstacle monitored by the infrared sensor being in the second preset distance (for example, 15 cm) during the fifth preset time period (the fifth preset time period requires for example 2s or more, for example, 3 s) indicates that the body of the aircraft is trapped. The forward direction of the flapping wing has a flight feature of continuous power, which determines that 2 s is long enough for the aircraft to stay away from the obstacle for a distance longer than the second preset distance (for example, more than 15 cm) when it can get out of trap. Therefore, the continuous occurrence of hitting can be effectively avoided and the safety of the fuselage is protected faster through the preset value range and threshold value, while the occurrence of false alarms is avoided and the normal flight of the aircraft is ensured.

In the embodiment of the present disclosure, as shown in FIG. 3, the above three movements are defined to realize the shutdown operation with respect to the structural characteristics of the flapping-wing aircraft, the user's hand-held habit and the feature of avoiding false alarm. The three movements are as follows. First, the body of the aircraft flies horizontally and the nose hits an obstacle. Second, the body of the aircraft is in an abnormal posture, with the bottom of the fuselage being upward, i.e. turning 180° horizontally or vertically. Third, the distance between the body of the aircraft and the obstacle sensed by the infrared sensor is less than a certain distance and lasts for more than a certain time. Using sensors to sense the existing movement changes of the body of the aircraft can realize automatic shutdown without the control of a remote controller. In addition, situations (e.g. the above three movements) that do not occur under various normal states of the aircraft are selected as shutdown movements to avoid shutdown caused by false triggering.

Of course, the shutdown operation is not limited to the above three types, for example, the current state of the aircraft is the nose-up state, the tail-up state, the state of a normal motor rotation speed and a slow flight speed, etc. Other shutdown operations designed based on the scheme of this embodiment and the inventive concept all fall within the scope of the present disclosure. It should be noted that the above-mentioned various threshold values and value ranges are all obtained by the analysis and multiple tests according to the structure, flight feature, etc. of the aircraft in the embodiment of the present disclosure. They are inventive, and not any threshold values and value ranges can realize the above-mentioned shutdown operation or startup operation. Even if the shutdown operation or startup operation is realized, there may be faults, resulting in startup and shutdown caused by false triggering. The above-mentioned threshold values and value ranges in the present application will not cause startup and shutdown caused by false triggering, thereby more accurate. However, in actual application, the above thresholds and value ranges will change correspondingly according to different structures and flight characteristics of the aircraft, i.e. the above data are not fixed, and the present disclosure is not limited to this.

It should be understood that although the steps in the flowcharts of FIGS. 1, 2 and 4 are shown in sequence as indicated by arrows, these steps are not necessarily performed in sequence as indicated by the arrows. The performing of these steps is not strictly limited in sequence, and these steps may be performed in other sequences, unless explicitly stated herein. Moreover, at least a part of the steps in FIGS. 1, 2 and 4 may include a plurality of sub-steps or a plurality of stages. These sub-steps or stages are not necessarily performed at the same time, but may be performed at different times, and the performing order of these sub-steps or stages is not necessarily sequential, but may be performed in turn or alternately with other steps or at least a part of the sub-steps or stages of the other steps.

In an embodiment, there is provided a switching apparatus of an aircraft, the aircraft comprising at least one sensor, the apparatus comprising: a detection module, which, in operation, detects a motor state of the aircraft; an acquisition module, which, in operation, acquires at least one sensing data of the at least one sensor; and a control module, which, in operation, controls the aircraft to perform a startup operation or a shutdown operation according to the motor state and the at least one sensing data.

For the specific definition of the switching apparatus of the aircraft, please refer to the above definition of the switching (startup/shutdown) method of the aircraft, which will not be repeated here. Each module in the above-mentioned switching apparatus of the aircraft can be implemented in whole or in part by software, hardware and combinations thereof. Each of the above modules may be embedded in or independent of the processor in the computer device in the form of hardware, or may be stored in the memory in the computer device in the form of software to facilitate the processor to call and perform the operations corresponding to each of the above modules.

Figure 5:
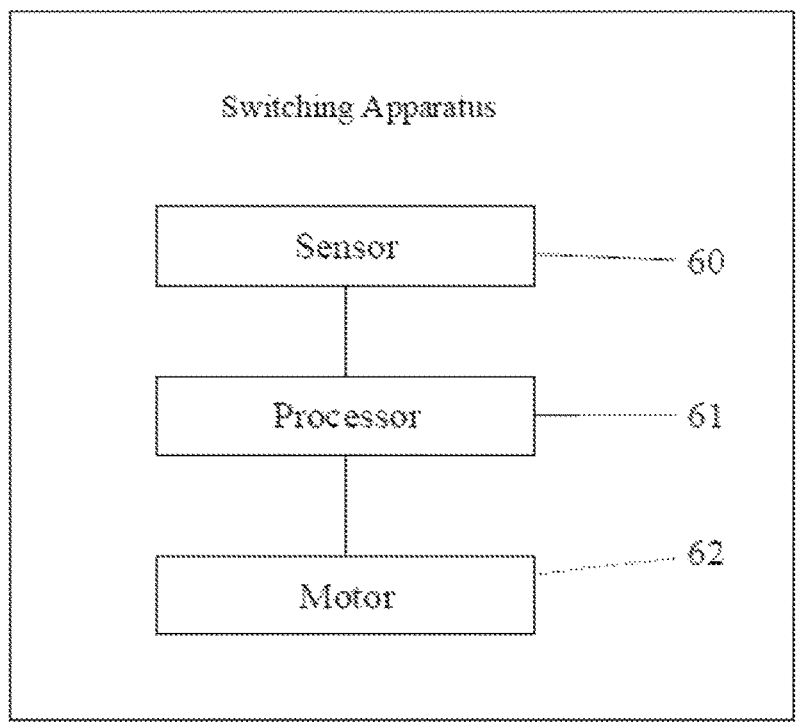
FIG. 5 is a structural diagram of a switching apparatus of an aircraft according to an embodiment.

In an embodiment, as shown in FIG. 5, there is provided a switching apparatus of an aircraft, the apparatus comprises a sensor 60, a processor 61 and a motor 62, wherein the sensor 60 is connected to the processor 61, and the processor 61 is connected to the motor 62.

The sensor 60, in operation, collects at least one sensing data and sends the at least one sensing data to the processor 61.

The processor 61, in operation, detects a motor state of the aircraft, generates a control command according to the motor state and the at least one sensing data, and sends the control command to the motor 62.

The motor 62, in operation, performs a startup operation or a shutdown operation according to the control instruction.

In an embodiment, the processor 61, in operation, controls the aircraft to perform the startup operation when determining that the current state of the aircraft meets a preset startup condition.

In an embodiment, the processor 61, in operation, determines that the current state of the aircraft meets the preset startup condition when the current state of the aircraft is any one of an up-and-down motion state, a back-and-forth motion state, a left-and-right motion state, a free falling body state, a forced forward motion state, and a rolling motion state, and controls the aircraft to perform the startup operation.

In an embodiment, the processor 61, in operation, judges whether the distance is greater than a first preset distance, and performs steps of controlling the aircraft to perform the startup operation in response to the distance being greater than the first preset distance.

In an embodiment, the processor 61, in operation, acquires a change trend of the acceleration data when the motor state is in a shutdown state. The current state of the aircraft is determined to be the up-and-down motion state when the change trend is that Z-axis acceleration data changes from a second value range to above a first preset threshold and falls back below a second preset threshold during a first preset time period.

In an embodiment, the change trend further includes that X-axis acceleration data is within a first value range and Y-axis acceleration data is within the first value range during the first preset time period.

In an embodiment, the processor 61, in operation, acquires a change trend of the acceleration data when the motor state is in a shutdown state. The current state of the aircraft is determined to be the rolling motion state, when the change trend is as follows: X-axis acceleration data changes from a first value range to a second value range or a third value range, and Z-axis acceleration data changes from the second value range to the first value range during a second preset time period; and the X-axis acceleration data changes from the second value range or the third value range and the changed X-axis acceleration data is within the first value range, and Z-axis acceleration data changes from the first value range to the second value range during a third preset time period.

In an embodiment, the change trend further includes that Y-axis acceleration data is within the first value range both during the second preset time period and the third preset time period.

In an embodiment, the processor 61, in operation, controls the aircraft to perform the shutdown operation when determining that the current state of the aircraft meets a preset shutdown condition.

In an embodiment, the processor 61, in operation, determines that the current state of the aircraft meets the preset shutdown condition when the current state of the aircraft is at least one of an impact state, a nose-up state, a tail-up state, a fuselage bottom-up state, a state of a normal motor rotation speed and a slow flight speed, and a trapped state, and controls the aircraft to perform the shutdown operation.

In an embodiment, the processor 61, in operation, acquires a change trend of the acceleration data when the motor state is a startup state. The current state of the aircraft is determined to be the impact state when the change trend is that Y-axis acceleration data changes from a fourth value range to above a fourth preset threshold, and Z-axis acceleration data changes from a fifth value range to above a fifth preset threshold during a fourth preset time period.

In an embodiment, the processor 61, in operation, acquires a change trend of the acceleration data when the motor state is a startup state. The current state of the aircraft is determined to be the fuselage bottom-up state when the change trend is that the X-axis acceleration data is within a sixth value range, the Y-axis acceleration data is within the sixth value range, and the Z-axis acceleration data is within a third value range.

In an embodiment, the processor 61, in operation, acquires the acceleration data and the distance when the motor state is a startup state. The current state of the aircraft is determined to be the trapped state when X-axis acceleration data is within a sixth value range, Y-axis acceleration data is within a fourth value range, the Z-axis acceleration data is within a fifth value range, and the distance is smaller than a second preset distance during a fifth preset time period.

In the embodiment of the present disclosure, the sensor and the processor maybe both installed on a Printed Circuit Board (PCB), and the PCB maybe placed at the central position of the fuselage of the flapping-wing aircraft, and the installation position may be located at the center of gravity of the entire aircraft as far as possible.

In an embodiment, there is provided an aircraft comprising a fuselage and a switching apparatus of the aircraft as in any one of the above embodiments, wherein the switching apparatus is connected to the fuselage.

In an embodiment, the switching apparatus is arranged on the fuselage.

In an embodiment, there is provided a non-transitory computer readable storage medium having stored thereon computer program which, when executed by a processor, performs steps of the method described in any one of the above embodiments.

One of ordinary skill in the art can understand that all or part of the flow in the method for implementing the above embodiments can be completed by instructing relevant hardware through computer program, which can be stored in a non-volatile computer readable storage medium, and which, when executed, can include the flow of the embodiments of the above methods. Any reference to memory, storage, database or other media used in various embodiments provided by this application may include non-volatile and/or volatile memory. The nonvolatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. By way of illustration and not limitation, RAM is available in various forms, such as static RAM (SRAM), dynamic RAM (DRAM), synchronous DRAM (SDRAM), dual data rate SDRAM (DDRSDRAM), enhanced SDRAM (ESDRAM), synchronous link DRAM (SLDRAM), memory bus (Rambus) direct RAM (RDRAM), direct memory bus dynamic RAM (DRDRAM), and memory bus dynamic RAM (RDRAM), etc.

The technical features of the above embodiments can be combined in any way. In order to simplify the description, not all possible combinations of the technical features of the above embodiments have been described. However, the combinations of these technical features should be considered as in the scope recorded in this specification as long as there is no contradiction in the combinations of these technical features.

The above-mentioned embodiments only represent several implementations of this application described in more detail, but they should not be construed as limiting the scope of the disclosure. It should be pointed out that for those of ordinary skill in the art, several modifications and improvements can be made without departing from the concept of this application, which are all within the scope of protection of this application. Therefore, the scope of protection of this disclosure shall be subject to the appended claims and the equivalent thereof.

This application claims priority to Chinese patent application No. 201910895313.0 filed on Sep. 20, 2019, the disclosure of which is incorporated herein by reference in its entirety as a part of this application.

The invention claimed is:

1. A control method for an aircraft with at least one sensor arranged thereon, the method comprising:
    detecting, by a processor, a motor state of the aircraft;
    acquiring, by the processor, at least one sensing data of the at least one sensor; and
    controlling the aircraft, by the processor, to perform a shutdown operation according to the motor state and the at least one sensing data, wherein, controlling the aircraft to perform the shutdown operation comprises:
        determining, by the processor, that a current state of the aircraft meets a preset shutdown condition when the current state of the aircraft is at least one of an impact state, a nose-up state, a tail-up state, a fuselage bottom-up state, a state of a normal motor rotation speed and a slow flight speed, and a trapped state; and
        controlling the aircraft, by the processor, to perform the shutdown operation based on determining that the current state of the aircraft meets the preset shutdown condition.

2. The method according to claim 1, further comprising:
    controlling the aircraft to perform a startup operation according to the motor state and the at least one sensing data, when determining that a current state of the aircraft meets a preset startup condition.

3. The method according to claim 2, wherein the step of controlling the aircraft to perform the startup operation when determining that the current state of the aircraft meets the preset startup condition comprises:
    determining that the current state of the aircraft meets the preset startup condition when the current state of the aircraft is any one of an up-and-down motion state, a back-and-forth motion state, a left-and-right motion state, a free falling body state, a forced forward motion state, and a rolling motion state, and
    controlling the aircraft to perform the startup operation.

4. The method of claim 3, wherein the at least one sensor comprises an infrared sensor, the at least one sensing data comprises infrared data, and the infrared data includes a distance between the aircraft and an obstacle around the aircraft during flight; and
    wherein the step of controlling the aircraft to perform the startup operation further comprises:
    judging whether the distance is greater than a first preset distance before controlling the aircraft to perform the startup operation, and
    controlling the aircraft to perform the startup operation, in response to the distance being greater than the first preset distance.

5. The method according to claim 3, wherein the motor state comprises a shutdown state, the at least one sensor comprises an accelerometer, and the at least one sensing data comprises acceleration data under a three-dimensional coordinate system established by X, Y and Z axes, wherein a direction of the X axis is a left-to-right direction of a body of the aircraft, a direction of the Y axis is a back-to-front direction of the body of the aircraft, and a direction of the Z axis is a bottom-to-top direction of the body of the aircraft; and
    wherein, the current state of the aircraft is the up-and-down motion state when the current state of the aircraft meets following condition: a change trend of the acceleration data acquired when the motor state is the shutdown state is that Z-axis acceleration data changes from a second value range to above a first preset threshold and falls back below a second preset threshold during a first preset time period.

6. The method of claim 5, wherein the change trend further includes: X-axis acceleration data within a first value range and Y-axis acceleration data within the first value range during the first preset time period.

7. The method according to claim 3, wherein the motor state comprises a shutdown state, the at least one sensor comprises an accelerometer, and the at least one sensing data comprises acceleration data under a three-dimensional coordinate system established by X, Y and Z axes, wherein a direction of the X axis is a left-to-right direction of a body of the aircraft, a direction of the Y axis is a back-to-front direction of the body of the aircraft, and a direction of the Z axis is a bottom-to-top direction of the body of the aircraft; and
    wherein, the current state of the aircraft is the rolling motion state when the current state of the aircraft meets following condition: a change trend of the acceleration data acquired when the motor state is the shutdown state is that X-axis acceleration data changes from a first value range to a second value range or a third value range, and Z-axis acceleration data changes from the second value range to the first value range during a second preset time period, and the X-axis acceleration data changes from the second value range or the third value range and the changed X-axis acceleration data is within the first value range, and the Z-axis acceleration data changes from the first value range to the second value range during a third preset time period.

8. The method of claim 7, wherein the change trend further includes: Y-axis acceleration data within the first value range both during the second preset time period and the third preset time period.

9. The method of claim 1, wherein the motor state comprises a startup state, the at least one sensor comprises an accelerometer, and the at least one sensing data comprises acceleration data under a three-dimensional coordinate system established by X, Y and Z axes;
   wherein a direction of the X axis is a left-to-right direction of a body of the aircraft, a direction of the Y axis is a back-to-front direction of the body of the aircraft, and a direction of the Z axis is a bottom-to-top direction of the body of the aircraft; and
   wherein, the current state of the aircraft is the impact state when the current state of the aircraft meets following condition: a change trend of the acceleration data acquired when the motor state is the startup state is that Y-axis acceleration data changes from a fourth value range to above a fourth preset threshold, and Z-axis acceleration data changes from a fifth value range to above a fifth preset threshold during a fourth preset time period.

10. The method of claim 1, wherein the motor state comprises a startup state, the at least one sensor comprises an accelerometer, and the at least one sensing data comprises acceleration data under a three-dimensional coordinate system established by X, Y and Z axes;
    wherein a direction of the X axis is a left-to-right direction of a body of the aircraft, a direction of the Y axis is a back-to-front direction of the body of the aircraft, and a direction of the Z axis is a bottom-to-top direction of the body of the aircraft; and
    wherein, the current state of the aircraft is the fuselage bottom-up state when the current state of the aircraft meets following condition: a change trend of the acceleration data acquired when the motor state is the startup state is that X-axis acceleration data is within a sixth value range, Y-axis acceleration data is within the sixth value range, and Z-axis acceleration data is within a third value range.

11. The method of claim 1, wherein the motor state comprises a startup state, the at least one sensor comprises an accelerometer and an infrared sensor, and the at least one sensing data comprises infrared data and acceleration data under a three-dimensional coordinate system established by X, Y and Z axes, the infrared data including a distance between the aircraft and an obstacle around the aircraft during flight;
    wherein a direction of the X axis is a left-to-right direction of a body of the aircraft, a direction of the Y axis is a back-to-front direction of the body of the aircraft, and a direction of the Z axis is a bottom-to-top direction of the body of the aircraft; and
    wherein, the current state of the aircraft is the trapped state when the current state of the aircraft meets the following conditions: the distance is smaller than a second preset distance and X-axis acceleration data of the acceleration data acquired when the motor state is the startup state is within a sixth value range, Y-axis acceleration data of the acceleration data is within a fourth value range, and Z-axis acceleration data of the acceleration data is within a fifth value range during a fifth preset time period.

12. A switching apparatus of an aircraft, wherein the aircraft comprises at least one sensor, the switching apparatus comprising a processor configured to:
    detect a motor state of the aircraft;
    acquire at least one sensing data of the at least one sensor; and
    control the aircraft to perform a shutdown operation according to the motor state and the at least one sensing data, wherein to control the aircraft to perform the shutdown operation, the processor is further configured to:
       determine that a current state of the aircraft meets a preset shutdown condition when the current state of the aircraft is at least one of an impact state, a nose-up state, a tail-up state, a fuselage bottom-up state, a state of a normal motor rotation speed and a slow flight speed, and a trapped state, and
       control the aircraft to perform the shutdown operation when determining that the current state of the aircraft meets the preset shutdown condition.

13. A switching apparatus of an aircraft, wherein the switching apparatus comprises:
    a sensor, a processor and a motor, the sensor is connected to the processor, and the processor is connected to the motor;
    the sensor configured to sense at least one sensing data and send the at least one sensing data to the processor;
    the processor configured to detect a motor state of the aircraft, generate a control instruction according to the motor state and the at least one sensing data, and send the control instruction to the motor; and
    the motor which, in operation, performs a shutdown operation according to the control instruction,
    wherein the processor is further configured to determine that a current state of the aircraft meets a preset shutdown condition when the current state of the aircraft is at least one of an impact state, a nose-up state, a tail-up state, a fuselage bottom-up state, a state of a normal motor rotation speed and a slow flight speed, and a trapped state, and controls the aircraft to perform the shutdown operation.

14. An aircraft comprising:
    a fuselage; and
    a switching apparatus, wherein the switching apparatus is connected to the fuselage, the switching apparatus comprising:
    a sensor, a processor and a motor, the sensor is connected to the processor, and the processor is connected to the motor;
    the sensor configured to sense at least one sensing data and sends the at least one sensing data to the processor;
    the processor configured to detect a motor state of the aircraft, generate a control instruction according to the motor state and the at least one sensing data, and send the control instruction to the motor; and
    the motor which, in operation, performs a shutdown operation according to the control instruction,
    wherein the processor is further configured to determine that a current state of the aircraft meets a preset shutdown condition when the current state of the aircraft is at least one of an impact state, a nose-up state, a tail-up state, a fuselage bottom-up state, a state of a normal motor rotation speed and a slow flight speed, and a trapped state, and controls the aircraft to perform the shutdown operation.

15. A non-transitory computer readable storage medium having a computer program stored thereon, wherein the computer program, when executed by a processor, performs a method comprising:
- detecting a motor state of an aircraft;
- acquiring at least one sensing data of at least one sensor; and
- controlling the aircraft, by the processor, to perform a shutdown operation according to the motor state and the at least one sensing data, wherein, controlling the aircraft to perform the shutdown operation comprises:
  - determining that a current state of the aircraft meets a preset shutdown condition when the current state of the aircraft is at least one of an impact state, a nose-up state, a tail-up state, a fuselage bottom-up state, a state of a normal motor rotation speed and a slow flight speed, and a trapped state; and
  - controlling the aircraft to perform the shutdown operation based on determining that the current state of the aircraft meets the preset shutdown condition.

* * * * *